US008635666B2

(12) United States Patent
Curnyn (10) Patent No.: US 8,635,666 B2
(45) Date of Patent: Jan. 21, 2014

(54) ANTI-PHISHING SYSTEM (75) Inventor: Jon Curnyn, Bucks (GB)

(73) Assignee: BAE Systems PLC, London (GB)

( * ) Notice: Subject to any disclaimer, the term of this patent is extended or adjusted under 35 U.S.C. 154(b) by 1715 days.

(21) Appl. No.: 11/794,995

(22) PCT Filed: Jan. 12, 2006

(86) PCT No.: PCT/GB2006/000097
§ 371 (c)(1),
(2), (4) Date: Jul. 10, 2007

(87) PCT Pub. No.: WO2006/120368
PCT Pub. Date: Nov. 16, 2006

(65) Prior Publication Data
US 2008/0141342 A1  Jun. 12, 2008

(30) Foreign Application Priority Data
Jan. 14, 2005 (EP) .................................. 05250157

(51) Int. Cl.
G06F 7/04 (2006.01)
(52) U.S. Cl.
USPC ............... 726/3; 726/11; 726/12; 713/153
(58) Field of Classification Search
USPC .............. 726/3, 11–14, 22–25; 713/153–154; 709/244, 206
See application file for complete search history.

(56) References Cited

U.S. PATENT DOCUMENTS 5,996,011 A     11/1999 Humes
2004/0078422 A1*  4/2004 Toomey .................... 709/202
2005/0015455 A1*  1/2005 Liu ........................... 709/207
2006/0021031 A1*  1/2006 Leahy et al. .................. 726/22
2007/0022202 A1*  1/2007 Finkle et al. ................ 709/227

FOREIGN PATENT DOCUMENTS

WO    WO 2004/036438 A1    4/2004

OTHER PUBLICATIONS

Greenfield, P. et al. "Access Prevention Techniques for Internet Content Filtering", Internetpublication, Dec. 1999, XP002265027, Sections I and II.
Alvey, R., "The Art of Web Filtering", Sans Institute [Online], Feb. 9, 2004, XP002340218 retrieved from the Internet: URL:http://cnscenter.future.co.kr/resource/security/application/1375.pdf>[retrieved on Aug. 10, 2005], 1 Introduction, 2 Background to content filtering.

(Continued)

Primary Examiner — Edward Zee
Assistant Examiner — Baotran N To
(74) Attorney, Agent, or Firm — Tarolli, Sundheim, Covell & Tummino LLP (57) ABSTRACT The present invention provides both method and apparatus for enhancing a user's network security. For example, it may be used to prevent phishing attacks being effected via the internet. A number of legitimate network addresses along with associated data are stored. Subsequently, analysis is carried out on any data transmitted between the user and a remote site to determine if the transmitted data is related to the stored data. If it is found that the data is related, user access to the remote site is denied unless the remote site's address is one of the stored network addresses. This provides more security than was previously available since it protects the user against attacks from sites that were not previously known to pose a threat.

21 Claims, 4 Drawing Sheets (56) References Cited

OTHER PUBLICATIONS

Rongbo, D. et al., "Web Filtering Using Text Classification", Networks, 2003, ICON2003. The 11$^{th}$ IEEE International Conference on Sep. 28-Oct. 1, 2003, Piscataway, NJ, USA, IEEE, Sep. 28, 2003, pp. 325-330, XP010683544, ISBN: 0-7803-7788-5.

Gregg T. et al., "Anti-Phishing: Best Practices for Institutions and Consumers", McAfee Research—Technical Report No. 04-004, Sep. 2004, XP002340219, retrieved from the Internet: URL:http://www.antiphishing.org/sponsors_technial_papers/Anti-Phishing_Best_Practices_for_Institutions_Consumer0904.pdf>[retrieved on Aug. 9, 2005].

Wu, "Thesis Proposal: Fighting Phishing at the User Interface", MIT Ph.D. Thesis Proposal, [Online], Dec. 2004, XP002340220, retrieved from the Internet: URL:http://groups.csail.mit.edu/uid/projects/phishing/proposal.pdf>[retrieved on Aug. 10, 2005].

Wu et al., "Fighting Phishing at the User Interface", Internet Publication, [Online], Dec. 2004, XP0023409221, retrieved from the Internet: URL:http://groups.csail.mit.edu/uid/projects/phishing/>[retrieved on Aug. 10, 2005].

Network Box Security Response: "Network Box Anti-Spam System", Internet Publication, [Online], Aug. 2004, XP002340222, retrieved from the Internet: URL:http://www.network-box.com/fileadmin/download_resources/public/Technology_Documentation/vl_Anti-Spam_White_Paper.pdf>[retrieved on Aug. 11, 2005].

\* cited by examiner

ANTI-PHISHING SYSTEM

BACKGROUND TO THE INVENTION

Phishing is a growing problem where malicious or criminal persons or organisations fool unsuspecting persons or organisations into revealing personal or corporate information, enabling identity theft from the victims. Phishing is usually composed of two parts:

(1) Phishing message delivery; and, (2) Effecting the phishing attack.

The delivery of a phishing message can occur over any internet application such as e-mail, web browsing, media, instant messaging (IM), and the phisher sends information in these messages hoping to fool the unsuspecting user into unknowingly providing information to the phisher. The messages use social engineering and other techniques used by virus writers to facilitate the phishing attack.

The phishing attack may be one where the user unwittingly executes the attack, or by automated means typically employed by virus writers. For example, the user may be instructed to go to a website, which he/she believes to be their bank, and enter their online banking name and password, but the site is actually operated by the phisher. Similarly, the attack may involve download of malware which automatically captures information (e.g. keyloggers) or exploits vulnerabilities in the user's machine which will cause information to be sent to the phisher, when the user believes it is being sent to a legitimate site.

The interception of the delivery of phishing messages can be achieved by existing content security tools such as anti-spam filters, and web page content blockers (which block generic types of content such as scripts or ActiveX controls).

These defenses can provide good protection from phishing attacks, but some messages will always get through, and may then cause a phishing attack to occur on the victim.

It is also known to inspect web-sites on a regular basis for use of unauthorised logos and messages, and if these are then thought to be used in phishing attacks, the websites are added to block lists used by standard web filtering products.

The current solutions in place to prevent a phishing attack from executing are both slow and incomplete solutions. The systems today which prime spam filters and web filtering blockers are effectively offline, and frequently undertaken by people, such that detecting new phishing messages or web-sites can take days before this information reaches the defense system.

Similarly, the phishers constantly move their attack sites around, such that they may never be seen by offline detection methods. Typically, phishing sites exist for around 48 hours. Therefore any information such as signatures loaded into defense systems will always be incomplete.

SUMMARY OF THE INVENTION

According to a first aspect of the present invention, there is provided a method of enhancing network security, comprising:

(i) storing a plurality of legitimate network addresses with associated data, (ii) analysing network traffic for data that appears related to the stored data, and, (iii) preventing, in the case that the network traffic data analysed in step (ii) is related to the stored data, user access to any network address that is the source or intended recipient of said network traffic data where said network address is not a stored legitimate network address.

According to a second aspect of the invention there is provided a computer program product comprising computer executable instructions for performing the method of the present invention.

According to a third aspect of the present invention there is provided a network security system, comprising:

a storage medium to store a plurality of legitimate network addresses with associated data, means to analyse network traffic for data that appears related to the stored data, and, means to prevent user access to any network address that is the source or intended recipient of said network traffic data in the case that said network traffic data is found to be related to the stored data and said network address is not a stored legitimate network address.

The present invention is preferably implemented on the internet as an anti-phishing service. In particular, it may protect against attacks over the world wide web or e-mail. However, it may be implemented on other types of networks, for instance to protect against short messaging service (SMS) phishing attacks, and may also be used to protect against other breaches of security, for instance it could be used to prevent trademark or copyright infringement.

When used to provide an anti-phishing service, the present invention automatically analyses content as it is transferred between a user and a remote site, and checks if this content is known to be used by phishers, or may be sourced by phishers. If the content is found to be of the type used by phishers then the address of the remote site is checked against a list of legitimate sites, and if the remote site is not on the list then access to it is denied. Preferably, this occurs in real-time as the user downloads the content and is not dependent on the update of any signature based information which is determined offline. This is a significant advantage over the prior art since it is impossible for phishers to overcome the protection by changing the web address of the phishing site.

The data stored by the present invention preferably includes known information from legitimate commercial websites likely to be subject to phishing attacks upon their customers (e.g. logos, keywords, styles, IP addresses, URLs). This enables phishing attacks upon these websites to be detected by the present invention. Data associated with legitimate sites may also include the identifiers or credentials used by the user to identify themselves to that site.

The network traffic preferably comprises one or more of the following: user requests for content from an address, content transmitted to the user from a remote site, and content transmitted to a remote site from the user. The present invention may therefore detect phishing or other attacks at a number of possible stages, allowing a layered defense to be provided. In the case of phishing, if the present invention fails to prevent a user accessing a phishing site, it may nevertheless recognise content downloaded from that site as being related to phishing. Should this also fail then the present invention prevents the user transmitting personal details to any website that is not known to be legitimate. This allows the present invention to provide a significantly more effective solution than previous, non-layered methods.

Preferably, a number of algorithms are used to determine if the network traffic data is related to the stored data. These may include but are not limited to, lexical analysis, image recognition, exact and inexact pattern matching, and digest calculation. It is also envisaged that in some cases data will be considered related because of the protocol adopted.

When the present invention determines that an attempted breach of security is underway, user access to the suspect site is denied and a notification is preferably sent to the user in place of any data requested. This notification provides feedback to the user. For example, it may explain that access to the relevant site has been denied and indicate the type of attack detected by the present invention. When the present invention is implemented across the internet the notification preferably takes the form of a block page though it is recognised that it may take a different form on other types of network.

It is known those perpetrating network attacks often perform "vulnerability probes" to determine the capabilities of any security systems present. It is therefore envisaged that, should an attack be detected, a check may be performed to ascertain whether a vulnerability probe is underway. For example, a vulnerability probe may be assumed to be underway if N similar attacks have happened in a time T. Preferably, when a vulnerability probe is detected, the sending of a notification of the type described above is prevented since such a notification may alert the attacker to the capabilities of the present invention.

Preferably, the present invention informs the proprietors of the legitimate site of any attempted breach of security.

The present invention may be used in combination with existing content security products. For example, a standard web filter may hold a large database of web sites or domains, and may therefore be used to eliminate many legitimate web sites as being used in phishing attacks. Similarly, anti-spam filters incorporate blacklists of network addresses, which include those used by phishers, hence they can identify content being sent to/from phishers. Therefore, it is envisaged that the present invention may both use these standard systems as an initial line of security, and that the information deduced by the present invention can be used to update such systems. For example, in the case of anti-spam filters, this update may comprise an addition to the blacklist or re-weighting of heuristics rules.

The present invention can be implemented on a number of devices, e.g. a PC, but for high performance for a number of users, a dedicated hardware analysis device having real time analysis capability is preferred.

BRIEF DESCRIPTION OF THE DRAWINGS

An example of the present invention will now be described in detail with reference to the accompanying drawings, in which.

DETAILED DESCRIPTION

Figure 1:
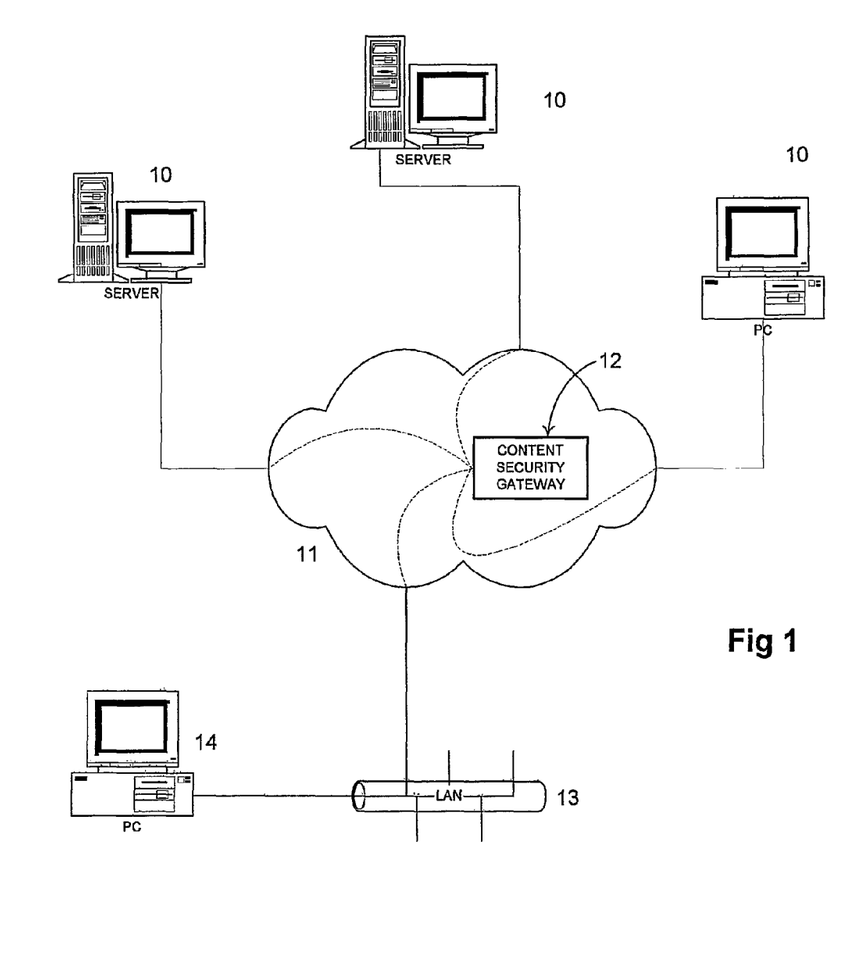
FIG. 1 shows the position of a content security gateway (CSG) on a network connecting remote servers to a user.

In a preferred embodiment, the present invention is implemented using a Content Security Gateway (CSG) of the type described in co-pending British patent application no. 0420548.0. A CSG is a multiple purpose device able to provide a number of real-time security services to the user. For example, it may comprise anti-virus and anti-spam capabilities in addition to the anti-phishing system of the present invention. As can be seen in FIG. 1, the CSG 12 intercepts all data transmitted between remote servers 10 or other devices and the user 14 across the internet 11. In the example shown in FIG. 1, the user is hosted by a Local Area Network (LAN) 13 and the CSG 12 is capable of monitoring the data transmitted to/from every device on the LAN 13. Furthermore, though not shown in FIG. 1, the CSG 12 may be independently monitoring data transmitted to additional devices not on the user's LAN 13. Thus the CSG 12 is able to monitor the data transmitted to a plurality of recipients, and is therefore able to detect bulk spam or phishing attacks, identifying and nullifying threats earlier than security software or hardware hosted by (and serving only) the user 14.

In one preferred embodiment, the CSG 12 forms part of an ISP's system, and its capabilities are thus services provided by the ISP to the user. Alternatively, the CSG 12 may implemented at the level of the LAN 13 or at any other level where the CSG 12 is able to intercept all data intended for the user.

In a preferred embodiment, the CSG 12 is realised as an embedded system product incorporating hardware, software and microcoded elements, which when combined with other standard infrastructure elements such as web servers and databases, enables a Managed Service provider, to deliver content security services in real time.

Figure 2:
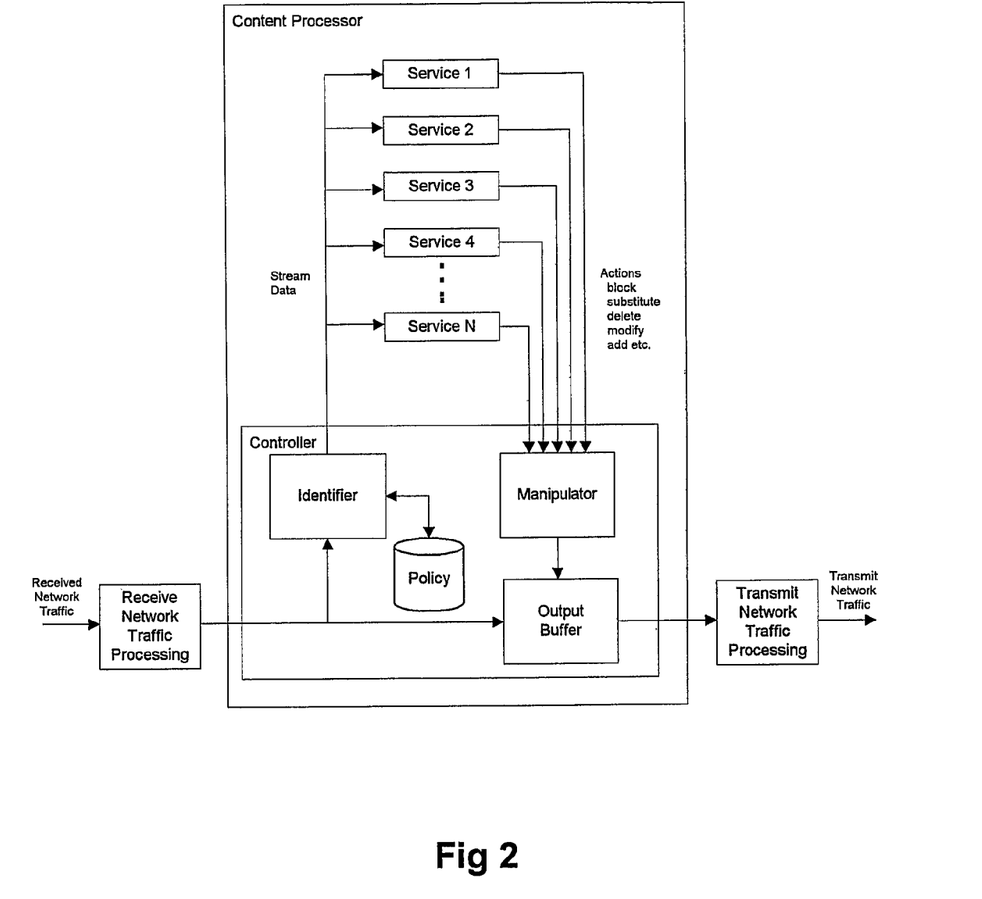
FIG. 2 shows a conceptual diagram of the operation of a content security gateway (CSG) in accordance with an embodiment of the present invention.

A conceptual diagram of the operation of a CSG is shown in FIG. 2. Network traffic is received, then identified, and then manipulated, before being transmitted. As can be seen in FIG. 2, there are provided a plurality of service modules (labelled Service 1 to Service N). Having been identified, data is sent to the service module defined by the policy. Each service module may provide a different service (such as anti-spam or anti-virus) or alternatively there may be a number of service modules devoted to each service in order to improve the rate at which data is processed. The provision of a plurality of service modules allows each module to be optimised for the task it carries out.

It is recognised, however, that the present invention may be implemented by devices other than CSGs. Any device with the requisite computational power that is in a position to intercept all communications between the user and the remote site may be used. For example, if the volume of traffic is small, either the user's PC or PC deployed at the network gateway (for example, a proxy) may implement the system of the present invention.

In use, the CSG is programmed with the following information lists
Site ID: organisation, URLs, IP addresses,
URL keywords: for example, names of banks and other organisations,
Organisation Specific information: logo size, colours, shapes, page digests, attributes (e.g. size), keywords, images etc.
User credentials: usernames, passwords, PINs, addresses
Preferably, organisations such as banks and other financial services provide this information to the administrators of the anti-phishing system directly. As such, it is envisaged that these organisations are 'partners' in the anti-phishing service and are therefore referred to accordingly hereinafter. However, it is possible that information is obtained by other means. For instance, by simply 'harvesting' details from the world wide web.

Once the CSG is primed with this information, the user may then be protected by an anti-phishing service.

Figure 3:
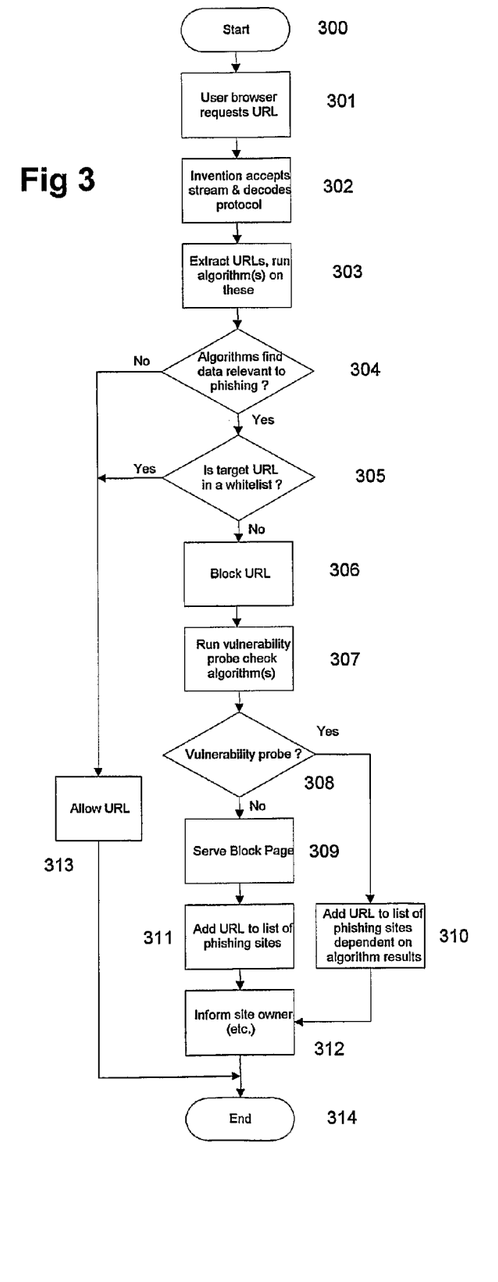
FIG. 3 is a flow diagram illustrating URL checking in accordance with the present invention.

The user may receive a phishing message which directs him/her to a website that is being used by a phisher. The invention undertakes the following defenses:
(i) URL checking: as shown in FIG. 3, the present invention intercepts the outbound URL in HTTP requests, and operates one or more algorithms in real-time to determine if the destination URL may be used by phishers. When a user browser requests a URL (step 301), the present invention intercepts the stream and decodes the protocol (step 302). It then extracts the URL and runs various algorithms upon it (step 304) to determine whether the URL could be relevant to phishing. For example, the URL is searched for keywords (e.g. Natwest, Barclays), and is considered relevant if such a keyword is present. If it is determined that the URL holds no relevance to phishing then the request is allowed (step 313). However if the URL does appear relevant, then the URL is checked against a list of legitimate addresses (step 305). If the URL is relevant and not included in this legitimate site list, the user's access to the suspect web site is blocked, for instance by blocking the HTTP GET request (step 306). In this case the present invention may run a 'vulnerability probe check' (step 307) as described in greater detail at point (v) below. Should this check not find evidence that a vulnerability probe is underway then a block page is served (step 309) informing the user of the attempted attack and the site is also 'learnt', and added to a standard web access filter that may be running on the invention (step 311). It is to be understood that the site information learnt may include the URL, the IP address, and the domain. Finally, the legitimate site owner is informed of the attempted breach of security (step 312).

The following is a non-exhaustive list of suitable algorithms for URL checking:
  a) Match on defined URL keywords provided by partners, which are a subset of the total URL, then detect as bogus by the size checking against legitimate URL). E.g. bogus URL is www.natwest_com.ukvalidator.com, match on natwest, reject as too many characters, or through digest compare on both URLs, or on simple compare with legitimate URL.
  b) Simple check of target URL against a blacklist
  c) Fuzzy match algorithm & compare derived name against list of keywords (e.g. match on nat_west.com). Then compare derived URL against list of legitimate URLs (attribute, digest, full compare).
  d) Check against a standard web access filter.
  e) Any combination of (a) to (d) above.

Alternatively or additionally, the present invention may scan incoming messages, for example e-mails, for URLs and prevent user access to these messages if the URLs are deemed to be suspect and/or the message does not originate from a legitimate address.

It also envisaged that it may be preferable to analyse only the domain rather than the complete URL.

Figure 4:
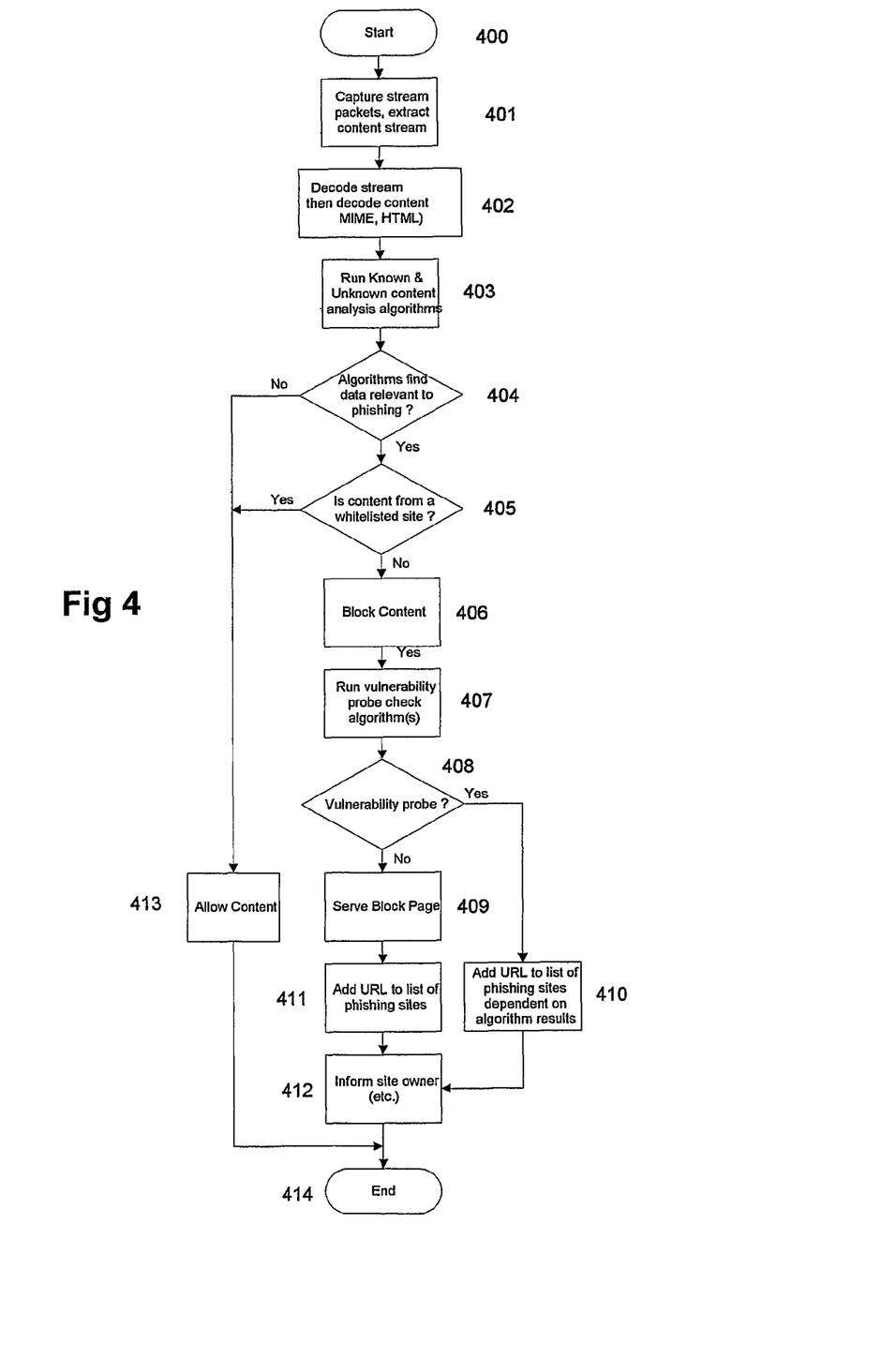
FIG. 4 is a flow diagram illustrating content analysis in accordance with the present invention; and, FIG. 5 is a flow diagram illustrating personal information checking in accordance with the present invention.

(ii) Known Content Analysis: if the web site access is permitted by the invention, the content being returned is checked. As shown in FIG. 4, the content is stripped from the protocol packets carrying it (step 401), to yield HTML, and this is then decoded (step 402), and subsequently analysed using a series of techniques such as pattern matching, digest calculation, and attribute checking (step 403) against information provided by partners. If this information does not match, the content is considered not relevant to phishing and content passes to the user (step 413). If the information matches, the content is deemed relevant to phishing and identified as being specific to an organisation, and the source of the content is then validated against legitimate IP addresses for that organisation (step 405). If the source is legitimate the content passes to the user (step 413). If not from a legitimate source, the content is blocked (step 406). The present invention may then run a 'vulnerability probe check' (step 408) as described in greater detail at point (v) below. Should this check not find evidence that a vulnerability probe is underway then a block page is served (step 409) informing the user of the attempted attack and the site is also 'learnt', and added to a standard web access filter that may be running on the invention (step 411). It is to be understood that the site information learnt may include the URL, the IP address, and the domain. Finally, the legitimate site owner is informed of the attempted breach of security (step 412).

The following is a non-exhaustive list of suitable algorithms:
  a) Calculate digests of pages, scripts, images and other features. Compare against information from legitimate sites.
  b) Pattern match keywords. Compare against keywords of legitimate sites.
  c) Measure attributes of pages (e.g. size, colours, fonts, page layout), compare against list of legitimate URLs.
  d) Any combination of (a) to (c) above.

(iii) Unknown content analysis: if the web site access is permitted by the invention, the content being returned is checked. As is also shown in FIG. 4, unknown content analysis is preferably carried out in conjunction with known content analysis. In particular, the content is stripped from the protocol packets carrying it (step 401), to yield HTML, and then decoded (step 402) and this is then analysed using an algorithm to determine if the content may intend to purport to be served by a partner (e.g. image identifies a logo, occurrence of organisation name etc.) (step 403). If the algorithm yields a negative result then the content passes to the user (step 413). If this algorithm yields a positive result, the content is deemed relevant to phishing and identified as being specific to an organisation, and the source of the content is then validated against legitimate IP addresses for that organisation (step 405). If the source is legitimate the content passes to the user (step 413). If not from a legitimate source, the content is blocked (step 406). In the case that content is blocked, the present invention may then run a 'vulnerability probe check' (step 408) as described in greater detail at point (v) below. Should this check not find evidence that a vulnerability probe is underway then a block page is served (step 409) informing the user of the attempted attack and the site is also 'learnt', and added to a standard web access filter that may be running on the invention (step 411). It is to be understood that the site information learnt may include the URL, the IP address, and the domain. Finally, the legitimate site owner is informed of the attempted breach of security (step 412).

The following is a non-exhaustive list of suitable algorithms:
  a) Image analysis to determine digest of shapes (e.g. logos). Compare against digests from legitimate sites.
  b) Image analysis: compare colours in use against legitimate sites.
  c) Lexical analysis: tokenise content, run heuristic algorithm which weights keywords (e.g. bank).
  d) Attribute analysis: measure attributes of pages (e.g. size, colours, fonts, page layout), compare against attributes lists of legitimate URLs.
  e) Any combination of (a) to (d) above.

Figure 5:
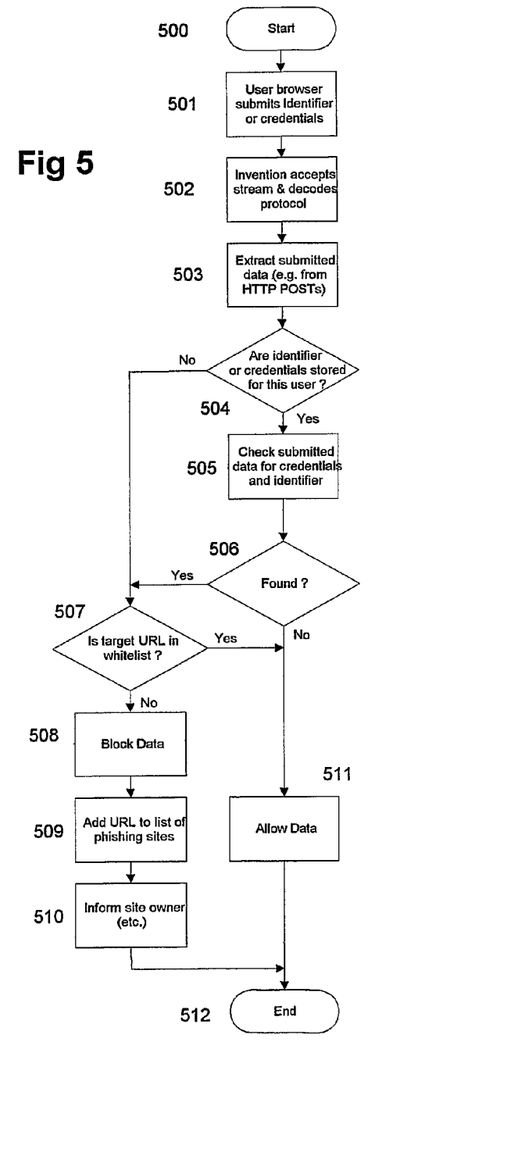

(iv) Personal Information checking: if the above defenses do not prevent access to the destination which is being used in the phishing attack, then, as shown in FIG. 5, the invention monitors access to destinations (e.g. websites) and searches the outgoing content for user credentials and identifiers. When the user's browser transmits such content (step 501) the invention is initially alerted to the possibility of a phishing attack by the protocol used (step 502). For example, HTTP POSTs are often used to carry user credentials and identifiers. When such a protocol is detected the invention searches to see if the particular user's details are available (step 504) (i.e. if user credentials and identifiers are stored for this user). Should the invention not have access to these details then the content is deemed relevant to phishing by default and is only allowed to pass (step 511) if the address of the target URL is on a whitelist (step 507). However, should access to these details be available then they are searched for through simple pattern matching (with anti-obfuscation) techniques (step 505). Should the user's identifiers and credentials be found then the content is again deemed relevant to phishing and only allowed to pass (step 511) if the address of the target URL is on a whitelist (step 507). If they are not found then the content is automatically allowed to pass (step 511). If the content is relevant to phishing and the address of the target URL is not on the whitelist then the data is blocked (step 508), the URL, and associated IP address and domain, are added to a list of phishing sites (step 509), and the site owner is informed (step 510).

(v) Vulnerability probe checking: it is well known for writers or distributors of malware or spam messages, to test out products which block, detect or report malware or spam circulated by those writers or distributors. The purpose of these tests by the writer or distributor is to seek out weaknesses (or vulnerabilities) in the detection & blocking capabilities of these products, by using new forms of content, or new obfuscation techniques, or new combinations of both to determine how to render these products useless.

As shown in FIGS. 3 and 4, when evidence of phishing is found the present invention therefore self-checks for high volumes of occurrences of URLs or content that are similar to known URLs or content that are similar in nature to each other, or similar in nature to known sites (steps 307 and 407). If these volumes cross a programmed threshold, it is assumed that a 'vulnerability probe' is underway, and this is reported to the partners (steps 312 and 412). It is also possible for the target URL (and associated domain and IP addresses) to be added to a list of phishing websites at this point (steps 310 and 410). However, this is not necessarily desirable since a vulnerability probe may include large numbers of requests for sites which don't exist and for similar addresses (for example, mybank001, mybank002, mybank003 etc). The present invention therefore contains algorithms for deciding whether a URL should be added to the list or not, and if so, whether only the exact URL or imperfect matches of the URL should be included. When a vulnerability probe is detected no block page is served to the user since it is not desirable to give any indication that the attempted attack has been prevented by the present invention. Furthermore, the details of the vulnerability probe (for example, the source IP address and the target URL) are also stored, allowing subsequent offline analysis of this data.

Specific examples of suitable vulnerability probe checks include:
a) URL checking: if N matches against a keyword are detected in time T, then trigger 'vulnerability probe in progress' and report this to the site owner. Add these sites to URL Filter lists to prohibit their future use. Do NOT serve block page, simply block outgoing HTTP GET.
b) Content Checking: if N matches of patterns, digests etc. are detected in time T, then trigger 'vulnerability probe in progress' and report this to the site owner. Add these sites to URL Filter lists to prohibit their future use. Do NOT serve block page, simply block content from being delivered to the user.

It is envisaged that the present invention will provide a layered defense system. That is, each defense mechanism happens in turn, and therefore the chance of detecting a phishing attack is greatly increased. In summary, for the example given above: the first stage is URL checking, intended to prevent access to phishing sites; should this fail, known and unknown content analysis is provided to prevent download of phishing material; should this also fail, personal information checking prevents the user from giving sensitive information to suspicious sites. The provision of vulnerability probe checking during the URL checking and known/unknown content analysis stages is preferable but not necessary for the provision of an effective anti-phishing system.

Though the present invention has been discussed in the context of PCs connected to the world wide web it may be applied to any network device connected to any network. For example, phishing attacks over the mobile phone network (via SMS) or through e-mail communications may be prevented using the present invention.

When an attack is effected over e-mail, a mail is sent to a user from a phisher asking for sensitive information, such as bank details. The attack is only complete when the user replies to this e-mail with the requisite details. Therefore, as before, communications to/from the user are intercepted and the protocol in use is decoded (for e-mail, an example is SMTP) and the content and/or content requests are analysed to see if they may relate to phishing. Furthermore, the identifiers containing the intended recipients of the e-mails are also intercepted and analysed. If any of the content, content requests, or identifiers are deemed to be related to phishing then access is blocked unless the remote address is contained on a list of legitimate network addresses. As will be clear to one skilled in the art, in this case it is e-mail addresses, rather than URLs, that are checked against legitimate network addresses.

In other contexts, the equivalent process involves screening the identifiers (such as URLs or e-mail addresses) against legitimate network addresses. For example, in the case of instant messaging, the IM identifier is extracted and subsequently (if the message appears relevant to phishing) compared against legitimate network addresses.

One skilled in the art will recognise the internet terms domain, URL, and IP address used above to be related as follows. An IP address is the term used for a network address on the Internet. A domain defines a group of IP addresses and may be given a name of the form of, for example, 'bbc.co.uk'. A URL defines a location on the world wide web. An example URL would be 'http://www.bbc.co.uk/newsitem.html' which points to a web page hosting a document on a web server within the 'bbc.co.uk' domain. One skilled in the art will therefore recognise that there are addresses associated with both URLs and domains and it is these that are used when checking a URL or domain against a list of legitimate addresses.

The invention claimed is:

1. A network-hosted method for providing an anti-phishing content security service for users of the network, comprising:
(i) storing a plurality of legitimate network addresses with associated data indicative of content that users associate with each of the stored plurality of legitimate network addresses;
(ii) analyzing network-borne traffic for data that appears related to the associated data;
(iii) in the event that the network-borne traffic data analyzed in step (ii) is related to the associated data, preventing user access to any network address that is the source or intended recipient of said network-borne traffic data where said network address is not a stored legitimate network address for the associated data;

(iv) adding network addresses, to which user access is prevented at step (iii), to store of prohibited network addresses for use by a present security service of by other security services; and wherein step (ii) comprises a lexical analysis of traffic data content using a heuristic algorithm having one or more rules for the comparison of said content with the stored associated data, the method further comprises the step:

(v) adjusting said one or more rules for use by the presented security service or by further security services in dependence upon the results of step (iii).

2. A method according to claim 1, wherein the network traffic data comprises an identifier indicating the intended recipient of the data.

3. A method according to claim 1, wherein the network traffic analyzed in step (ii) comprises a user request for content from an address.

4. A method according to claim 1, wherein the network traffic analyzed in step (ii) comprises content transmitted to the user from a remote site.

5. A method according to claim 1, wherein the network traffic analyzed in step (ii) comprises data transmitted to a remote site from the user.

6. A method according to claim 1 wherein step (ii) comprises the steps of:

analyzing a user request for content from an address, and, if said address is not related to the stored data, subsequently;

analyzing content transmitted to the user from said address, and, if said content is not related to the stored data, subsequently; and, analyzing data transmitted to said address from the user.

7. A method according to claim 1, further comprising the step of establishing, in the case that the network traffic data analyzed in step (ii) is related to the stored data, whether a vulnerability probe is underway.

8. A method according to claim 1, further comprising the step of sending, in the case that the network traffic data analyzed in step (ii) is related to the stored data and it has not been established that a vulnerability probe is underway, notification to the user in place of any data requested from said network address.

9. A method according to claim 1, wherein the network is the internet.

10. A method according to claim 9, further comprising the step of adding a domain containing network addresses to which user access is prevented to a list of prohibited domains.

11. A method according to claim 1, wherein the network is a general purpose data network.

12. A method according to claim 1, wherein the network is a network used for mobile telephony.

13. A method according to claim 1, wherein the list of prohibited network addresses is made available for use by further security services.

14. The method according to claim 1, wherein, at step (ii), the associated data comprise a user's personal data and wherein step (iii) comprises preventing the transmission of traffic containing said personal data to any network address that is not a stored legitimate network address for said personal data.

15. A computer program product includes a non-transitory computer readable storage medium comprising computer executable instructions that when executed by a computer cause a computer to perform each of the method steps of claim 1.

16. A network-hosted security system for providing an anti-phishing content security service, comprising:

a non-transitory computer readable storage medium to store a plurality of legitimate network addresses with associated data indicative of content that users associate with each of the plurality of stored legitimate network addresses;

means to analyze incoming or outgoing network traffic from user terminal equipment for data that appears related to the associated data;

means to control access from the user terminal equipment to any network address that is the source or intended recipient of said network traffic data in the case that said network traffic data is found to be related to the associated data and said network address is not a stored legitimate network address for the associated data;

means to add network addresses to which user access is controlled to a list of prohibited network addresses for use by a security service;

wherein the means to analyze comprises a lexical analysis of network traffic data content using a heuristic algorithm having one or more rules for the comparison of said network traffic content with the associated data; and means to adjust the one or more of the rules of the heuristic algorithm for use by the security service based on results of the means to control.

17. A system according to claim 16, wherein the list of prohibited network addresses is utilized by one or more additional content security services.

18. A user terminal equipment-hosted method for providing an anti-phishing content security service for users of the terminal equipment, comprising:

(i) storing a plurality of legitimate network addresses with associated data indicative of content that users associate with each of said plurality of legitimate addresses;

(ii) analyzing traffic incoming to or outbound from the user terminal equipment for data that appears related to the associated data; and (iii) in the event that the traffic data analyzed in step (ii) is related to the associated data, controlling access from the user terminal equipment to any network address that is the source or intended recipient of said traffic data where said network address is not a stored legitimate network address for the associated data;

(iv) adding network addresses, to which user access is controlled at step (iii), to a store of prohibited network addresses for use by a present security service of by other security services; and wherein step (ii) comprises a lexical analysis of traffic data content using a heuristic algorithm having one or more rules for the comparison of said content with the stored associated data, the method further comprises the step:

(v) adjusting said one or more rules for use by the present security service or by further security services in dependence upon the results of step (iii).

19. The method according to claim 18, wherein, at step (ii), the associated data comprise a user's personal data, and at step (iii) controlling access comprises alerting the respective user before transmitting the traffic containing said personal data to any network address that is not a stored legitimate network address for said personal data.

20. The method according to claim 18, wherein, at step (ii), the associated data comprise a user's personal data and wherein, at step (iii) controlling access comprises preventing the transmission of traffic containing said personal data to any network address that is not a stored legitimate network address for said personal data.

21. The method according to claim 18, wherein traffic incoming to the user terminal equipment comprises data being carried in one or more e-mails and wherein, at step (iii), controlling access comprises preventing access to said one or more e-mails if they originate from an e-mail address that is not a stored legitimate network address for the associated data.

* * * * *